United States Patent [19]
Dauvergne

[11] Patent Number: 5,449,321
[45] Date of Patent: Sep. 12, 1995

[54] VENTILATING AND HEATING APPARATUS FOR THE CABIN OF A VEHICLE

[75] Inventor: Jean Dauvergne, Fosses, France

[73] Assignee: Valeo Thermique Habitacle, Le Mesnil, France

[21] Appl. No.: 130,102

[22] Filed: Sep. 30, 1993

[30] Foreign Application Priority Data

Oct. 2, 1992 [FR] France .................. 92 11680

[51] Int. Cl.⁶ ........................... B60H 1/00
[52] U.S. Cl. ..................... 454/139; 454/156
[58] Field of Search ................ 454/139, 156

[56] References Cited

U.S. PATENT DOCUMENTS

| | | | |
|---|---|---|---|
| 2,430,335 | 11/1947 | Hart | 454/156 |
| 5,280,852 | 1/1994 | Danvergne | 454/139 |

FOREIGN PATENT DOCUMENTS

| | | |
|---|---|---|
| 1323602 | 3/1963 | France . |
| 3702629 | 8/1988 | Germany . |
| 59-032513 | 2/1984 | Japan . |
| 62-080118 | 4/1987 | Japan . |
| 63-028714 | 2/1988 | Japan . |
| 336709 | 4/1959 | Switzerland . |
| WO/9106441 | 5/1991 | WIPO . |

OTHER PUBLICATIONS

Patent Abstracts of Japan, vol. 11, No. 271 (M-624)(2728) Sep. 11, 1987.
Patent Abstracts of Japan, vol. 8, No. 128 (M-302)(1565) Jun. 14, 1984.
Patent Abstracts of Japan, vol. 12, No. 236 (M-715)(3083) Jul. 6, 1988.

*Primary Examiner*—Marguerite Macy
*Attorney, Agent, or Firm*—Morgan & Finnegan

[57] ABSTRACT

A motor vehicle has a heating and ventilating system for the cabin of the vehicle, including an air treatment zone arranged in front of the cabin, with a recirculating air inlet which passes air from the cabin back to the treatment zone. The floor of the cabin has a double wall defining a recirculating air duct within it, the recirculation air inlet being at the rear end of this duct, so that air can be recirculated from the back of the cabin to the treatment zone in the form of a moving air mattress under the floor. This mattress improves the insulation of the feet of the occupants from the outside atmosphere.

2 Claims, 1 Drawing Sheet

VENTILATING AND HEATING APPARATUS FOR THE CABIN OF A VEHICLE

FIELD OF THE INVENTION

This invention relates to a heating, ventilating, and/or air conditioning apparatus for the cabin of a vehicle, comprising an air treatment zone containing treatment means such as a blower, a heat source, and regulating valves, this air treatment zone being arranged in front of the cabin and communicating with the latter firsfly through outlets enabling the treated air to be delivered into the cabin, and secondly through at least one inlet which enables recirculated air to be admitted into the said zone.

BACKGROUND OF THE INVENTION

In such an apparatus, for obvious reasons of convenience, the recirculation air inlet, like the outlets through which air is admitted into the cabin, is generally placed in the front of the cabin. A much reduced, or even non-existent, air flow in the rear region of the cabin can result from this. In addition, when the outside temperature is either very high or very low, the floor of the vehicle which is directly in contact with the outside atmosphere, and which is exposed in the first case to thermal radiation from the road surface, is itself brought to a high or low temperature, which in either case leads to discomfort for the occupants of the cabin whose feet rest on the floor.

DISCUSSION OF THE INVENTION

An object of the present invention is to overcome these drawbacks, and to enable air to flow in the whole internal space within the cabin, while also providing a comfortable temperature on the floor.

According to the invention, in an apparatus of the kind defined under "Field of the Invention" above, the said inlet is situated in the rear region of the cabin and is connected to the said zone through a recirculation duct defining a moving air mattress within a double wall of the floor of the vehicle, the said mattress extending over an area corresponding to at least a substantial part of the floor area of the cabin.

The air which is treated by the apparatus flows into the cabin between the outlets, at least some of which are arranged in the front region of the cabin, with the inlet or inlets mentioned above being situated in the rear region of the cabin. This arrangement forces the air flow to pass right through the whole of the cabin. In addition, the upper wall of the floor, which is in contact with the feet of the occupants of the vehicle, is in contact through its lower face by the air stream (i.e. the air mattress) which has just left the cabin, and which is consequently at a temperature not very different from that prevailing in the cabin itself. This upper wall is, moreover, protected from radiation from the road surface by the lower wall, i.e. the outer skin of the double wall which forms the cabin floor, so insulating the feet of the occupants from extremes of heat or cold from the road surface.

Some further preferred features of the apparatus in accordance with the invention are as follows, these being complementary to each other or alternative to each other:

the said moving air mattress extends over all or nearly all of the lower surface of the cabin, that is to say it extends under the whole or nearly the whole of the cabin floor;

the apparatus includes a recirculation adjusting member disposed at the downstream end of the recirculating duct, for admitting an adjustable fraction of the air flow in the said duct into the treatment zone as recirculated air, the complementary fraction (i.e. the remainder of the air flow) being directly evacuated to the outside through an air outlet.

Further features and advantages of the invention will appear more clearly on a reading of the detailed description of a preferred embodiment of the invention which follows, and which is given by way of example only and with reference to the accompanying drawings.

DESCRIPTION OF A PREFERRED EMBODIMENT OF THE INVENTION

Figure 1:
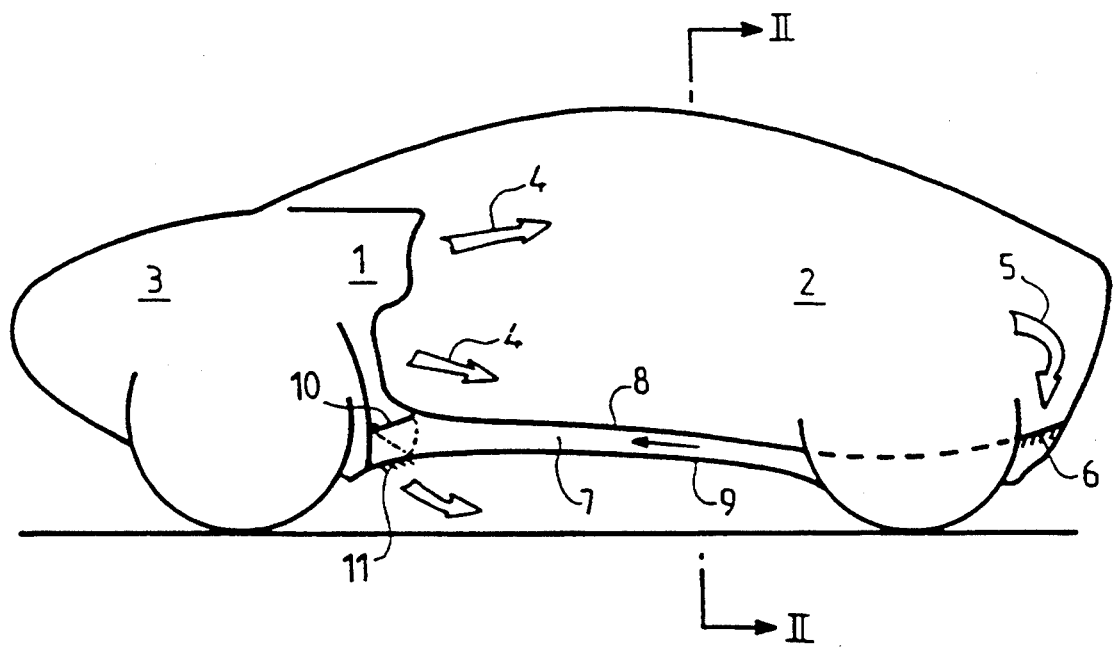
FIG. 1 is a diagrammatic representation of the body of a motor vehicle having a system in accordance with the invention, shown in longitudinal cross section.
Figure 2:
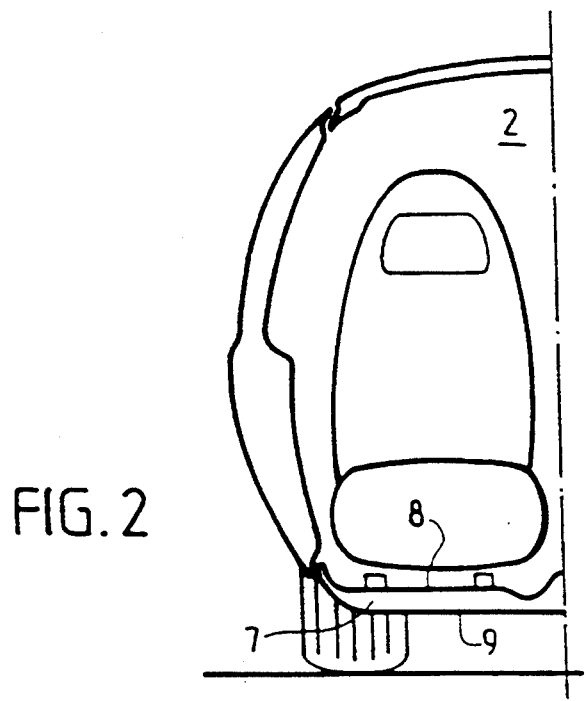
FIG. 2 is a partial view in cross section taken on the line II—II in FIG. 1.

The vehicle shown in the drawings has a heating and ventilating system comprising an air treatment zone 1 which is placed in front of the cabin 2, between the latter and the engine hood 3. The air treatment zone 1 is in direct communication with the cabin through appropriate air outlets, in such a way as to deliver into the cabin a current of treated air indicated by the arrows 4. This treated air flows from the front to the rear of the cabin, and is directed as indicated by an arrow 5, towards a recirculating air inlet 6 which is situated at the rear of the cabin. The inlet 6 is connected to the treatment zone I through a recirculation duct 7, which defines a moving air mattress between an upper wall 8 and a lower wall 9 of the floor of the cabin 2 of the vehicle. The duct 7 extends over all, or virtually all, of the lower surface of the cabin, and is so designed that the flow of air also extends over at least most of this lower surface.

By way of example, suppose that the outside temperature is $-10°$ C., and that air heated to 45° C. leaves the treatment zone as indicated by the arrows 4, so that the temperature in the centre of the cabin is equal to 25° C. The temperature of the air is 20° C. at the back of the cabin, 15° C. in the rear part of the duct 7, and 10° C. towards the front of the latter, that is to say the lower surface of the wall 8 is exposed to a temperature which is greater than the outside temperature by at least 20° C.

In the example shown, a recirculation adjusting flap valve 10, and an air outlet 11 for exhausting air outside the vehicle, are both provided at the front end of the duct 7, at the junction between the latter and the treatment zone 1. The flap valve 10 is arranged to be able to pivot in such a way as to bring the duct 7 into communication with the zone 1 and/or the outlet 11, so as to admit into the treatment zone an adjustable fraction of the total air flow in the duct 7. In the case in which at least some of this flow is evacuated through the outlet 11, a corresponding air flow is introduced into the treatment zone through an outside air inlet not shown.

What is claimed is:

1. A vehicle having a cabin defining a rear region thereof and a floor of said cabin, the vehicle further including two doors and an apparatus for at least one function selected from heating, ventilating and air conditioning the cabin, said apparatus including: means defining an air treatment zone forward of the cabin; air treatment means in said treatment zone, air outlet means connecting said treatment zone with the cabin whereby to deliver treated air form the treatment zone into the cabin; and at least one inlet associated with said air treatment zone, for receiving recirculated air for admission into said zone, wherein the floor of the cabin comprises a double wall defining a recirculation duct within it corresponding to a substantial portion of the cabin floor area, said inlet means being arranged at said rear region of the cabin to bring the cabin into communication with said recirculation duct, whereby air can be recirculated in the form of a moving air mattress from said rear region to said treatment zone via the recirculation duct, wherein the air recirculation duct and said moving air mattress extend under all or nearly all of the cabin floor from vehicle door to vehicle door and from the front of the cabin floor to the rear of the cabin floor; the vehicle further including recirculation air adjusting means arranged at the downstream end of the recirculation duct, and an air outlet for evaluating air to outside the vehicle and associated with said adjusting means, whereby an adjustable fraction of the air flow in the recirculation duct can be admitted as recirculated air into the treatment zone with the remainder thereof being evacuated through said air outlet.

2. A vehicle having a cabin defining a rear region thereof and a floor of said cabin, the vehicle further including two doors and an apparatus for at least one function selected from heating, ventilating and air conditioning the cabin, said apparatus including: means defining an air treatment zone forward of the cabin; air treatment means in said treatment zone, air outlet means connecting said treatment zone with the cabin whereby to deliver treated air form the treatment zone into the cabin; and at least one inlet associated with said air treatment zone, for receiving recirculated air for admission into said zone, wherein the floor of the cabin comprises a double wall defining a recirculation duct within it corresponding to a substantial portion of the cabin floor area, said inlet means being arranged at said rear region of the cabin to bring the cabin into communication with said recirculation duct, whereby air can be recirculated in the form of a moving air mattress from said rear region to said treatment zone via the recirculation duct, wherein the air recirculation duct and said mattress occupy an area under all or nearly all of the cabin floor from vehicle door to vehicle door and from the front of the cabin floor to the rear of the cabin floor; the vehicle further including recirculation air adjusting means arranged at the downstream end of the recirculation duct, and an air outlet for evaluating air to outside the vehicle and associated with said adjusting means, whereby an adjustable fraction of the air flow in the recirculation duct can be admitted as recirculated air into the treatment zone with the remainder thereof being evacuated through said air outlet.

* * * * *